United States Patent
Teglia et al.

(10) Patent No.: US 7,363,547 B2
(45) Date of Patent: Apr. 22, 2008

(54) ERROR-DETECTION CELL FOR AN INTEGRATED PROCESSOR

(75) Inventors: Yannick Teglia, Marseilles (FR); Pierre-Yvan Liardet, Peynier (FR)

(73) Assignee: STMicroeletronics S.A., Montrouge (FR)

( * ) Notice: Subject to any disclaimer, the term of this patent is extended or adjusted under 35 U.S.C. 154(b) by 586 days.

(21) Appl. No.: 10/886,992

(22) Filed: Jul. 8, 2004

(65) Prior Publication Data
US 2005/0022071 A1    Jan. 27, 2005

(30) Foreign Application Priority Data
Jul. 9, 2003    (FR) .................................. 03 50312

(51) Int. Cl.
*G06F 11/00*    (2006.01)
(52) U.S. Cl. .......................................... 714/48; 714/25
(58) Field of Classification Search .................. 714/25, 714/47, 48, 736
See application file for complete search history.

(56) References Cited

U.S. PATENT DOCUMENTS

| 4,233,682 | A | | 11/1980 | Liebergot et al. | |
|---|---|---|---|---|---|
| 4,727,544 | A | * | 2/1988 | Brunner et al. | 463/29 |
| 5,493,649 | A | * | 2/1996 | Slivka et al. | 714/48 |
| 6,098,194 | A | * | 8/2000 | Rinne et al. | 714/807 |
| 6,330,668 | B1 | | 12/2001 | Curiger et al. | |
| 6,732,274 | B1 | * | 5/2004 | Charron | 713/193 |
| 6,839,849 | B1 | * | 1/2005 | Ugon et al. | 726/20 |
| 6,959,391 | B1 | * | 10/2005 | Baldischweiler | 726/34 |
| 7,155,590 | B2 | * | 12/2006 | Mathis | 711/164 |
| 7,201,662 | B2 | * | 4/2007 | LeMay et al. | 463/43 |
| 2003/0226082 | A1 | * | 12/2003 | Kim et al. | 714/734 |

FOREIGN PATENT DOCUMENTS

EP    0 318 021 A    5/1989

* cited by examiner

*Primary Examiner*—Marc Duncan
(74) *Attorney, Agent, or Firm*—Lisa K. Jorgenson; James H. Morris; Wolf, Greenfield & Sacks, P.C.

(57) ABSTRACT

A cell for detecting a disturbance capable of affecting the operation of a processor in which it is integrated, including circuitry for holding an invariant in normal operation of the processor and for detecting an invariant loss consecutive to the occurrence of a disturbance.

15 Claims, 1 Drawing Sheet

ERROR-DETECTION CELL FOR AN INTEGRATED PROCESSOR

BACKGROUND OF THE INVENTION

1. Field of the Invention

The present invention relates to the field of integrated processors executing a program or any data manipulation to provide a result.

The present invention more specifically relates to the detection of an error (voluntary or incidental) in the program execution. Such errors or faults may result from the occurrence of a temporary current on the processor power supply for a short time (known as a glitch), from a variation in the processor power supply voltage or a program trap attempt by any other means.

2. Discussion of the Related Art

The detection of a possible fault injection in the execution of a program by an integrated processor is used, for example, to detect a possible modification in the sequencing of the program instruction series. Such a modification may be part of an attack aiming at discovering secret data manipulated by a program algorithm. For example, in an authentication, authorization or the like process, certain branching are critical. If the program is trapped by being forced to execute one or several instructions, this may lead to a violation of the authentication procedure.

A first conventional example of a fault detection system consists of controlling the program execution by calculating an execution signature and checking this signature against a pre-recorded signature. A disadvantage of such a technique is that it is only applicable to pre-established data, and thus on a portion of the code itself and cannot take account of the processed data. Another disadvantage is that the control can only be performed a posterior, at the end of the program execution.

A second known technique consists of executing a program more than once (redundancy), and only validating a result if these executions each time provide the same result. A disadvantage of such a technique is that it requires significant hardware and/or software resources which further are a function of the complexity of the program which is desired to be monitored. Moreover, permanent errors (permanent forcing of a given state) are not detected.

SUMMARY OF THE INVENTION

The present invention aims at providing a novel solution to detect the occurrence of a possible error in an automated processing by an integrated processor which overcomes the disadvantages of known solutions.

The present invention especially aims at providing a solution which only requires limited software and hardware resources. In particular, the present invention aims at providing a solution in which the required resources are negligible as compared to those required by the executed (monitored) software.

The present invention also aims at providing a solution which is independent from the program executed by the processor and which is thus compatible with possible developments of this program.

The present invention also aims at providing a so-called dynamic solution which does not require waiting for the end of the program execution to detect the occurrence of a possible error.

To achieve these and other objects, the present invention provides a cell for detecting a disturbance capable of affecting the operation of a processor in which it is integrated, comprising means for holding an invariant in normal operation of the processor and for detecting an invariant loss consecutive to the occurrence of a disturbance.

According to an embodiment of the present invention, the disturbance acts through the power supply of the cell and of the processor.

According to an embodiment of the present invention, at least one value necessary to the verification of the invariant is stored in a non-volatile memory element, the cell comprising means for periodically recalculating said value in volatile memory elements.

According to an embodiment of the present invention, the cell comprises means for checking the invariant by comparing said value stored in the non-volatile memory element with a periodically-calculated current value.

According to an embodiment of the present invention, the cell comprises two first registers intended to contain two pre loaded data having a sum equal to said value stored in the non-volatile memory element, and a third register intended to contain the result of the sum of the first two periodically calculated to be compared to the value stored in the non-volatile memory element, to check the invariant.

According to an embodiment of the present invention, the data are pre loaded into the first and second registers at each beginning of the execution of a program to be monitored.

The present invention also provides an integrated processor, comprising one or several detection cells.

The foregoing and other objects, features, and advantages of the present invention will be discussed in detail in the following non-limiting description of specific embodiments in connection with the accompanying drawings.

DETAILED DESCRIPTION

Figure 1:
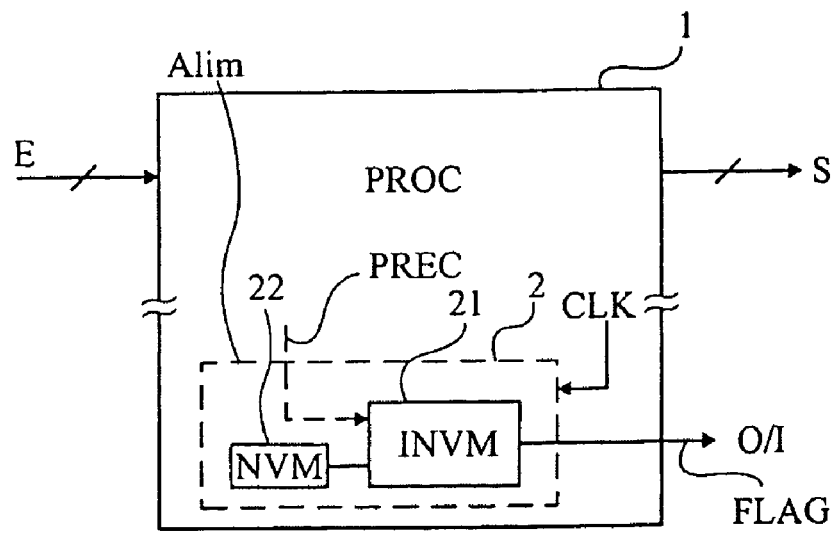
FIG. 1 very schematically shows in the form of blocks an integrated circuit processor according to the present invention.

The same elements have been designated with the same reference numerals in the different drawings. For clarity, only those elements and steps necessary to the understanding of the present invention have been shown in the drawings and will be described hereafter. In particular, the processings performed by the integrated circuit processor to which is added a cell specific to the present invention have not been described in detail. The present invention applies whatever the processor type and the performed data manipulations.

A feature of the present invention is to integrate, with a processor in which the occurrence of a disturbance capable of affecting the operation of this processor is desired to be detected, a cell for holding an invariant capable of being affected by the same type of disturbances. According to the present invention, the invariant-holding cell performs digital processings, which makes it sensitive to the same type of disturbances as are capable of affecting the progress of a program executed by the processor.

In the meaning of the present invention, an invariant is a property that remains true all along the execution of any program by the integrated circuit, provided that the processing circuits are not disturbed, for example, by a variation in the processor power supply.

FIG. 1 very schematically shows in the form of blocks an integrated processor 1 equipped with a disturbance detection cell 2 according to the present invention. Processor 1 is very schematically shown and, conventionally, receives data and control signals on multiple inputs E, provides data and control signals on multiple inputs S, and is supplied (ALIM).

According to the present invention, the integrated processor comprises at least one cell 2 for holding an invariant. In the example illustrated in FIG. 1, cell 2 comprises a block 21 for holding an invariant that it compares with a datum NVM stored in a non-volatile memory 22 to provide one or several bits indicative by their states of a loss or not of the invariant. In the illustrated example, the case of a single flag bit (FLAG) is considered. According to the realization of cell 2, said cell may receive pre loaded data PREC coming from outside of the cell. This preloading however remains according to the present invention limited to the beginning of the execution of the program which is desired to be monitored. Afterwards, cell 2 has an entirely autonomous operation with respect to the rest of the integrated processor from which it only receives its power supply and, possibly a clock signal CLK. Thus, cell 2 is never submitted to input or output data processed by the processor except for the possible preload.

Another feature of the present invention is that cell 2 uses resources of same nature as those exploited by the processor, to be sensitive to the same types of disturbances. More specifically, cell 2 comprises digital processing circuits (for example, registers, operators, etc.).

Figure 2:
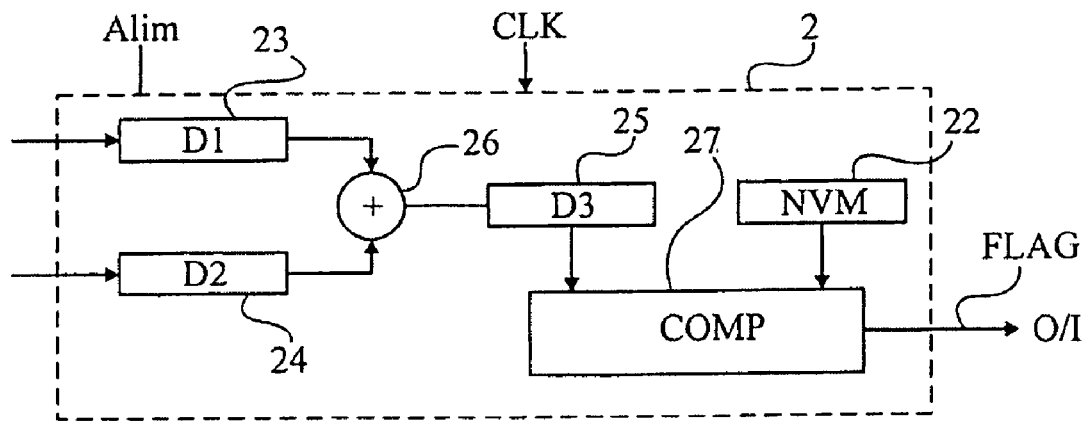
FIG. 2 very schematically shows in the form of blocks a preferred embodiment of an error-detection cell according to the present invention.

FIG. 2 very schematically shows in the form of blocks a preferred embodiment of a disturbance detection cell 2 according to the present invention.

Cell 2 comprises three registers 23, 24, and 25, an adder 26, a comparator 27 and a non-volatile memory element 22. Element 22 indifferently is a ROM element, a data hardwired upon circuit manufacturing or any other equivalent system. What matters is that the NVM datum contained by element 22 is not likely to be modified in particular by the occurrence of a disturbance supposed to be detected by cell 2, and thus that element 22 is in particular insensitive to disturbances of power supply ALIM of the integrated processor.

Figure 3:
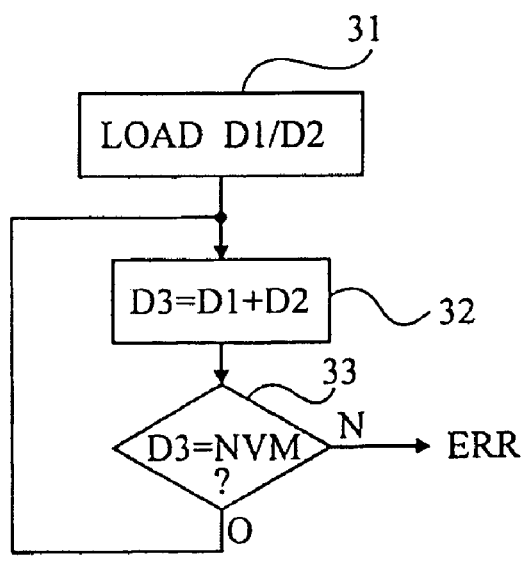
FIG. 3 is a simplified timing diagram illustrating the operation of the cell of FIG. 2.

FIG. 3 illustrates in the form of a simplified timing diagram the operation of the cell of FIG. 2.

Registers 23 and 24 are intended to be pre loaded, for example upon power-on of circuit 1 or at the beginning of the execution of a program to be monitored, with data D1 and D2, sum D3 of which is in principle identical to value NVM.

Once data D1 and D2 have been pre loaded (block 31, LOAD D1/D2) in registers 23 and 24, no further data input is allowed in cell 2 for the rest of the execution of the program to be monitored.

Periodically, for example, at each executed program cycle, the contents of registers 23 and 24 are added by adder 26 to obtain a result D3 stored in register 25 (block 32, D3=D1+D2).

The contents of register 25 and of element 22 are then compared (block 33, D3=NVM ?). The result of this comparison provides, for example, a flag bit (FLAG) at state 0 or 1 indicative of the detection of a possible error.

If bit FLAG provides a result corresponding to the identity of data D3 and NVM, the sequence is reproduced at the next cycle, except of course for the loading of data D1 and D2. In the opposite case, the state switching of the flag generates an error processing ERR since the cell has detected a disturbance.

It should be noted that the present invention does not aim at preventing the occurrence of an error, but only at detecting it. The processing to be performed when an error occurs depends on the application and may correspond to any conventional error processing.

In the embodiment of FIGS. 2 and 3, the invariant is the equality between datum D3 and datum NVM.

The choice of the periodicity of the invariant verification depends on the application. The shorter the period, the more rapidly the detection cell will react to the occurrence of a disturbance preventing it from holding the invariant.

An advantage of the present invention is that it enables detecting the occurrence of a disturbance likely to modify the execution of a real-time processing, that is, without waiting for the end of the execution of this program.

Another advantage of the present invention is that its implementation is particularly simple and little resource-consuming, especially with respect to the execution of a redundant calculation.

According to another embodiment, a bubble sorting of a data table stored in a register or in a RAM associated with the processor, which is periodically compared with a set of identical tables stored in a non-volatile memory may be used. In case of the occurrence of a disturbance, the table sorting is disturbed, which enables a detection. The invariant here is the fact that the data table in the RAM is sorted up to rank n (and corresponds to tables of the non-volatile memory) at the n-th iteration of the algorithm.

It should be noted that several detection cells may be distributed at different locations of the integrated processor to make the detection more robust.

According to another embodiment, the detection cell comprises a network of registers disseminated within the circuit, which are refreshed at each clock pulse and the invariant character of which is verified against a reference datum stored in a non-volatile element.

Of course, the present invention is likely to have various alterations, modifications, and improvements which will readily occur to those skilled in the art. In particular, the practical implementation of the present invention based on the functional indications given hereabove is within the abilities of those skilled in the art. Further, although the verification of the invariant has been described with the use of a hardware comparator, it should be noted that the present invention may also be implemented with a software comparison, the important point being that the cell holds an invariant element using the same technology as the processor with which the cell is integrated, to be sensitive to the same type of disturbance. In this case, it will be ascertained to place the detection indicator in the error state before checking the invariant.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An integrated cell for detecting a disturbance capable of affecting operation of a processor, comprising:
   non-volatile storage means, in the integrated cell, for storing at least one value of verification of an invariant; and means, in the integrated cell, for periodically recalculating said at least one value in volatile memory elements of the integrated cell, for holding the invariant in normal operation of the processor and for detecting an invariant loss consecutive to an occurrence of the disturbance.

2. The cell of claim 1, wherein the disturbance acts through the power supply of the cell and of the processor.

3. The cell of claim 1, wherein the cell comprises means for checking the invariant by comparing said value stored in the non-volatile storage means with a periodically-calculated current value.

4. The cell of claim 1, comprising two first registers intended to contain two pre loaded data having a sum equal to said value stored in the non-volatile memory element, and a third register intended to contain the result of the sum of the first two, periodically calculated to be compared to the value stored in the non-volatile memory element, to check the invariant.

5. The cell of claim 4, wherein the data are pre loaded into the first and second registers at each beginning of the execution of a program to be monitored.

6. An integrated processor, comprising at least one detection cell of claim 1.

7. A method for detecting a disturbance affecting operation of a processor, the method comprising:
storing, in a non-volatile memory element of an integrated cell, at least one value of verification of an invariant affected by the disturbance;
periodically recalculating the at least one value to obtain a current value;
storing, in volatile memory elements of the integrated cell, the invariant in normal operation of the processor; and
detecting, in the volatile memory elements of the integrated cell, a loss of the invariant upon an occurrence of the disturbance.

8. The method of claim 7, wherein the disturbance acts through a power supply of the integrated cell and the processor.

9. The method of claim 7, further comprising checking the invariant by comparing the at least one value stored in the non-volatile memory element with the periodically recalculated current value.

10. An apparatus for detecting a disturbance affecting operation of a processor, the apparatus comprising:
a non-volatile memory element in an integrated cell for storing at least one value of verification of an invariant affected by the disturbance; and
volatile memory elements in the integrated cell for periodically recalculating the at least one value to obtain a current value, holding the invariant in normal operation of the processor, and detecting a loss of the invariant upon an occurrence of the disturbance.

11. The apparatus of claim 10, further comprising:
a first register pre loaded with a first datum;
a second register pre loaded with a second datum, wherein a sum of the first datum and the second datum equals to the value stored in the non-volatile memory element; and
a third register containing the current value that is a result of adding contents of the first register and the second register, wherein the current value is periodically calculated to be compared to the value stored in the non-volatile memory element, to check the invariant.

12. The apparatus of claim 11, wherein the first register is pre loaded with the first datum and the second register is pre loaded with the second datum at a beginning of an execution by the processor of a program to be monitored.

13. The apparatus of claim 11, wherein the first register is pre loaded with the first datum and the second register is pre loaded with the second datum upon a power-on of the processor.

14. The apparatus of claim 11, wherein an error is detected if the current value is not equal to the value stored in the non-volatile memory element.

15. The apparatus of claim 12, wherein, after the first register is pre loaded with the first datum and the second register is pre loaded with the second datum, operation of the integrated cell is autonomous with respect to operation of the processor.

* * * * *

UNITED STATES PATENT AND TRADEMARK OFFICE
CERTIFICATE OF CORRECTION

PATENT NO. : 7,363,547 B2
APPLICATION NO. : 10/886992
DATED : April 22, 2008
INVENTOR(S) : Yannick Teglia et al.

It is certified that error appears in the above-identified patent and that said Letters Patent is hereby corrected as shown below:

Col. 1, line 24 should read:
authorization or the like process, certain branchings are Col. 2, lines 18-19 should read:
cell comprises two first registers intended to contain two preloaded data having a sum equal to said value stored in the
line 25 should read:
data are preloaded into the first and second registers at each Col. 3, line 18 should read:
said cell may receive pre loaded data PREC coming from
line 48 should read:
Registers 23 and 24 are intended to be pre loaded, for
line 53 should read:
Once data D1 and D2 have been pre loaded (block 31, Col. 5, line 14 should read:
intended to contain two preloaded data having a sum equal
line 20 should read:
The cell of claim 4, wherein the data are preloaded into Col. 6, lines 14-15 should read:
a first register preloaded with a first datum;
a second register preloaded with a second datum, wherein

UNITED STATES PATENT AND TRADEMARK OFFICE
CERTIFICATE OF CORRECTION

PATENT NO. : 7,363,547 B2
APPLICATION NO. : 10/886992
DATED : April 22, 2008
INVENTOR(S) : Yannick Teglia et al.

It is certified that error appears in the above-identified patent and that said Letters Patent is hereby corrected as shown below:

Col. 6, lines 26-27 should read:
preloaded with the first datum and the second register is preloaded with the second datum at a beginning of an execution
lines 31-32 should read:
preloaded with the first datum and the second register is preloaded with the second datum upon a power-on of the
lines 39-40 should read:
register is preloaded with the first datum and the second register is preloaded with the second datum, operation of the Signed and Sealed this First Day of July, 2008

JON W. DUDAS
*Director of the United States Patent and Trademark Office*